(12) United States Patent
Wang et al.

(10) Patent No.: US 11,388,036 B2
(45) Date of Patent: Jul. 12, 2022

(54) METHOD AND APPARATUS FOR MANAGING MANAGED FUNCTION OBJECT

(71) Applicant: Huawei Technologies Co., Ltd., Shenzhen (CN)

(72) Inventors: Fengbao Wang, Shanghai (CN); Ruiyue Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 489 days.

(21) Appl. No.: 16/232,620

(22) Filed: Dec. 26, 2018

(65) Prior Publication Data
US 2019/0132188 A1 May 2, 2019

Related U.S. Application Data

(63) Continuation of application No. PCT/CN2016/088006, filed on Jun. 30, 2016.

(51) Int. Cl.
*H04L 41/0233* (2022.01)
*H04L 41/5051* (2022.01)
*H04L 67/10* (2022.01)

(52) U.S. Cl.
CPC ...... *H04L 41/0233* (2013.01); *H04L 41/5051* (2013.01); *H04L 67/10* (2013.01)

(58) Field of Classification Search
CPC .. H04L 41/0233; H04L 41/5051; H04L 67/10
See application file for complete search history.

(56) References Cited

U.S. PATENT DOCUMENTS 6,018,625 A * 1/2000 Hayball ............. H04L 41/0233
703/22
6,366,657 B1 * 4/2002 Yagel ................. H04L 41/0233
379/201.03

(Continued)

FOREIGN PATENT DOCUMENTS

CN 104219127 A 12/2014
CN 104253866 A 12/2014

(Continued)

OTHER PUBLICATIONS

"Network Functions Virtualisation (NFV); Infrastructure Overview," ETSI GS NFV-INF 001 V1.1.1, pp. 1-59, European Telecommunications Standards Institute (Jan. 2015).

(Continued)

*Primary Examiner* — Nam T Tran
(74) *Attorney, Agent, or Firm* — Leydig, Voit & Mayer, Ltd.

(57) ABSTRACT

A method and an apparatus for managing a managed function object are provided, and relate to the field of communications technologies. In the embodiments of the present invention, a management request for a managed function object is received. The management request carries indication information of an application, and the indication information of the application is used to instruct to associate the managed function object with the application. The managed function object is managed based on the indication information of the application. To be specific, when the management request that carries the indication information of the application is received, the managed function object is flexibly associated with any application indicated by the indication information, so as to combine the managed function object with the any application, thereby externally providing a network service.

12 Claims, 3 Drawing Sheets

(56) References Cited

U.S. PATENT DOCUMENTS

| | | | | |
|---|---|---|---|---|
| 2005/0120103 A1* | 6/2005 | Godin | ................ | H04L 41/0233 |
| | | | | 709/223 |
| 2008/0312898 A1* | 12/2008 | Cleary | ................ | H04L 41/0233 |
| | | | | 703/21 |
| 2012/0159176 A1 | 6/2012 | Ravindran et al. | | |
| 2014/0201374 A1 | 7/2014 | Ashwood-Smith et al. | | |
| 2015/0222534 A1 | 8/2015 | Dunbar et al. | | |
| 2016/0112261 A1 | 4/2016 | Amato | | |
| 2017/0063598 A1 | 3/2017 | Zhu et al. | | |
| 2017/0126512 A1* | 5/2017 | Seed | ................ | H04L 41/0806 |
| 2017/0244596 A1 | 8/2017 | Chen | | |

FOREIGN PATENT DOCUMENTS

| | | |
|---|---|---|
| CN | 105282765 A | 1/2016 |
| RU | 2551814 C2 | 5/2015 |
| RU | 2573771 C2 | 1/2016 |
| WO | 2014110453 A1 | 7/2014 |
| WO | 2015172362 A1 | 11/2015 |
| WO | 2016000382 A1 | 1/2016 |

OTHER PUBLICATIONS

"3rd Generation Partnership Project; Technical Specification Group Services and System Aspects; Telecommunication Management; Configuralion Management (CM) for mobile networks that include virtualized network functions; Procedures (Release 14)," 3GPP TS 28.511 V0.3.0, 3rd Generation Partnership Project, Valbonne, France (May 2016).

* cited by examiner

METHOD AND APPARATUS FOR MANAGING MANAGED FUNCTION OBJECT

CROSS-REFERENCE TO RELATED APPLICATIONS

This application is a continuation of International Application No. PCT/CN2016/088006, filed on Jun. 30, 2016, the disclosure of which is hereby incorporated by reference in its entirety.

TECHNICAL FIELD

Embodiments of the present invention relate to the field of communications technologies, and in particular, to a method and an apparatus for managing a managed function object.

BACKGROUND

With rapid development of communications technologies, a network functions virtualization (NFV) technology emerges in the communications field. The NFV technology is a technology in which software is carried by using a universal hardware platform, to establish an NFV implementation environment, and a plurality of telecommunications network functions are implemented by using the software, to avoid dependence of the telecommunications network function on a dedicated physical device.

A conventional network management system includes a network manager and an element manager, and is mainly responsible for managing a service or a network. A managed object of the conventional network management system is a network element. In an implementation process, the conventional network management system creates a managed object for each network element. An NFV implementation environment includes a service management system and an NFV management and orchestration (MANO) system. The service management system may include a network manager (NM), an element manager (EM), a service orchestrator (SO), and a network orchestrator (NO), and is mainly responsible for managing a service or a network. A managed object of the service management system is a network function. In a management process, the service management system needs to create a managed object for each network function. In this specification, the managed object of the network function is referred to as a managed function object for short. The NFV MANO system mainly includes an NFV orchestrator (NFVO) and a VNF manager (VNFM), and is mainly responsible for internal implementation of a telecommunications network function, that is, responsible for virtual resource management and software deployment. A managed object of the NFV MANO system is a virtualized network function (VNF) or a virtualized network function component (VNFC). The VNF may include one or more VNFCs, and one VNF or one VNFC is one application.

Currently, in the conventional art, the managed object of the conventional network management system is the network element, and a scenario in which a function is separate from implementation is not involved. However, in the NFV implementation environment, management on the managed function object and management on the VNF are two independent processes. Therefore, how to combine the managed function object with the VNF to externally provide a network service is of great importance.

SUMMARY

Embodiments of the present invention provide a method and an apparatus for managing a managed function object, so as to resolve a prior-art problem. The technical solutions are as follows:

According to a first aspect, a method for managing a managed function object is provided, and the method includes:

receiving a management request for a managed function object, where the management request carries indication information of an application, and the indication information of the application is used to associate the managed function object with the application; and managing the managed function object based on the indication information of the application.

In this embodiment of the present invention, when the management request that carries the indication information of the application is received, the managed function object is flexibly associated with any application indicated by the indication information, so as to combine the managed function object with the any application, thereby externally providing a network service.

With reference to the first aspect, in a first possible implementation of the first aspect, the indication information of the application includes an identifier or a name of the application.

In this embodiment of the present invention, when the indication information of the application includes the identifier or the name of the application, the application is associated with the managed function object based on the identifier or the name of the application, so as to manage the managed function object.

With reference to the first aspect, in a second possible implementation of the first aspect, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In this embodiment of the present invention, when the indication information of the application includes the type information of the application or the information about the managed function object, the application may be associated with the managed function object based on the type information of the application or the information about the managed function object, so as to manage the managed function object.

With reference to the second possible implementation of the first aspect, in a third possible implementation of the first aspect, the managing the managed function object based on the indication information of the application includes:

obtaining an identifier or a name of the application based on the type information of the application or the information about the managed function object, to manage the managed function object.

In this embodiment of the present invention, when the indication information of the application includes the type information of the application or the information about the managed function object, and when the managed function object is managed, the identifier or the name of the application further needs to be obtained based on the type information of the application or the information about the managed function object, so as to determine an application that needs to be associated with the managed function object.

With reference to the third possible implementation of the first aspect, in a fourth possible implementation of the first aspect, the obtaining an identifier or a name of the application based on the type information of the application or the information about the managed function object includes:

requesting, based on the type information of the application or the information about the managed function object, an application management unit to create the application and return the identifier or the name of the application; or obtaining the identifier or the name of the application based on the type information of the application or the information about the managed function object by deploying or selecting the application.

In this embodiment of the present invention, for example, the execution body is an EM. In a process of obtaining the identifier or the name of the application, the EM may send an application creation request to the application management unit, so that the application management unit returns the generated identifier or name of the application to the EM after creating the application. In this way, the EM obtains the identifier or the name of the application. Alternatively, the EM may deploy or select the application based on the type information of the application or the information about the managed function object. In this process, the identifier or the name of the application may be generated. In this way, a manner of obtaining the identifier or the name of the application is added.

With reference to the fourth possible implementation of the first aspect, in a fifth possible implementation of the first aspect, the application management unit is a network functions virtualization orchestrator NFVO or a virtualized network function manager VNFM.

In this embodiment of the present invention, the NFVO may create the application and return the identifier or the name of the application; or certainly, the VNFM may create the application and return the identifier or the name of the application, so that a manner of creating the application is added, and a manner of obtaining the identifier or the name of the application is indirectly added.

With reference to any one of the foregoing possible implementations of the first aspect, in a sixth possible implementation, the managing the managed function object based on the indication information of the application includes:

associating the managed function object with the application by establishing a mapping relationship between the application and the managed function object.

In this embodiment of the present invention, when the indication information of the application includes the identifier or the name of the application, the managed function object may be associated with the application by establishing the mapping relationship between the application and the managed function object, so as to manage the managed function object.

With reference to any one of the foregoing possible implementations of the first aspect, in a seventh possible implementation, the managing the managed function object based on the indication information of the application includes:

associating the managed function object with the application by configuring the identifier or the name of the application in the managed function object.

In this embodiment of the present invention, when the indication information of the application includes the identifier or the name of the application, the managed function object may be associated with the application by configuring the identifier or the name of the application in the managed function object, so as to manage the managed function object, thereby adding an association method.

With reference to any one of the foregoing possible implementations of the first aspect, in an eighth possible implementation, the managing the managed function object based on the indication information of the application includes:

associating the managed function object with the application by creating the managed function object for the application.

In this embodiment of the present invention, the managed function object may be associated with the application by creating the managed function object for the application, so as to manage the managed function object, thereby adding an association method.

According to a second aspect, a method for managing a managed function object is provided, and the method includes:

sending a management request for a managed function object to a managed function management unit, where the management request carries indication information of an application, the indication information of the application is used to instruct the managed function management unit to associate the managed function object with the application, and the management request is used to instruct the managed function management unit to manage the managed function object based on the indication information of the application.

In this embodiment of the present invention, the management request that carries the indication information of the application is sent to the managed function management unit, so that the managed function management unit flexibly associates the managed function object with any application indicated by the indication information, so as to combine the managed function object with the any application, thereby externally providing a network service.

With reference to the second aspect, in a first possible implementation of the second aspect, the indication information of the application includes an identifier or a name of the application.

In this embodiment of the present invention, when the indication information of the application includes the identifier or the name of the application, the application is associated with the managed function object based on the identifier or the name of the application, so as to manage the managed function object.

With reference to the first possible implementation of the second aspect, in a second possible implementation of the second aspect, before the sending a management request for a managed function object to a managed function management unit, the method further includes:

obtaining the identifier or the name of the application.

In this embodiment of the present invention, before the managed function object is managed, the identifier or the name of the application further needs to be obtained, so as to determine an application that needs to be associated with the managed function object.

With reference to the second possible implementation of the second aspect, in a third possible implementation of the second aspect, the obtaining the identifier or the name of the application includes:

requesting an application management unit to create the application and return the identifier or the name of the application.

In this embodiment of the present invention, in a process of obtaining the indication information of the application, an application creation request that carries type information of the application may be sent to the application management unit, so that the application management unit creates the application, and returns the identifier or the name of the application. In this way, the identifier or the name of the application may be obtained.

With reference to the third possible implementation of the second aspect, in a fourth possible implementation of the second aspect, the requesting an application management unit to create the application and return the identifier or the name of the application includes either of the following implementations:

receiving an identifier or a name sent by the application management unit, where the identifier or the name sent by the application management unit is sent by the application management unit after the application management unit creates the application; or receiving an identifier or a name sent by the managed function management unit, where the identifier or the name sent by the managed function management unit is sent by the application management unit to the managed function management unit after the application management unit creates the application.

In this embodiment of the present invention, in the foregoing process of obtaining the identifier or the name of the application, the identifier or the name may be specifically obtained by receiving the identifier or the name sent by the application management unit, or may be obtained by receiving the identifier or the name sent by the managed function management unit, so that a manner of obtaining the identifier or the name is added.

With reference to the second aspect, in a fifth possible implementation of the second aspect, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In this embodiment of the present invention, when the indication information of the application includes the type information of the application or the information about the managed function object, the application may be associated with the managed function object based on the type information of the application or the information about the managed function object, so as to manage the managed function object.

With reference to the fifth possible implementation of the second aspect, in a sixth possible implementation of the second aspect, the application management unit is a network functions virtualization orchestrator NFVO or a virtualized network function manager VNFM.

In this embodiment of the present invention, the NFVO may create the application and return the identifier or the name of the application; or certainly, the VNFM may create the application and return the identifier or the name of the application, so that a manner of creating the application is added, and a manner of obtaining the identifier or the name of the application is indirectly added.

With reference to any one of the foregoing possible implementations of the second aspect, in a seventh possible implementation of the second aspect, the managed function management unit includes an element manager EM.

In this embodiment of the present invention, the management request for the managed function object may be sent to the EM, and the EM associates the application with the managed function object based on the indication information of the application.

According to a third aspect, an apparatus for managing a managed function object is provided, and the apparatus includes:

a receiving module, configured to receive a management request for a managed function object, where the management request carries indication information of an application, and the indication information of the application is used to associate the managed function object with the application; and a management module, configured to manage the managed function object based on the indication information of the application.

With reference to the third aspect, in a first possible implementation of the third aspect, the indication information of the application includes an identifier or a name of the application.

With reference to the third aspect, in a second possible implementation of the third aspect, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

With reference to the second possible implementation of the third aspect, in a third possible implementation of the third aspect, the apparatus further includes:

an obtaining module, configured to obtain an identifier or a name of the application based on the type information of the application or the information about the managed function object, to manage the managed function object.

With reference to the third possible implementation of the third aspect, in a fourth possible implementation of the third aspect, the obtaining module is configured to:

request, based on the type information of the application or the information about the managed function object, an application management unit to create the application and return the identifier or the name of the application; or obtain the identifier or the name of the application based on the type information of the application or the information about the managed function object by deploying or selecting the application.

With reference to the fourth possible implementation of the third aspect, in a fifth possible implementation of the third aspect, the application management unit is a network functions virtualization orchestrator NFVO or a virtualized network function manager VNFM.

With reference to any one of the foregoing possible implementations of the third aspect, in a sixth possible implementation of the third aspect, the management module is configured to:

associate the managed function object with the application by establishing a mapping relationship between the application and the managed function object.

With reference to any one of the foregoing possible implementations of the third aspect, in a seventh possible implementation of the third aspect, the management module is configured to:

associate the managed function object with the application by configuring the identifier or the name of the application in the managed function object.

With reference to any one of the foregoing possible implementations of the third aspect, in an eighth possible implementation of the third aspect, the management module is configured to:

associate the managed function object with the application by creating the managed function object for the application.

According to a fourth aspect, an apparatus for managing a managed function object is provided, and the apparatus includes:

a sending module, configured to send a management request for a managed function object to a managed function management unit, where the management request carries indication information of an application, the indication information of the application is used to instruct the managed function management unit to associate the managed function object with the application, and the management request is used to instruct the managed function management unit to manage the managed function object based on the indication information of the application.

With reference to the fourth aspect, in a first possible implementation of the fourth aspect, the indication information of the application includes an identifier or a name of the application.

With reference to the first possible implementation of the fourth aspect, in a second possible implementation of the fourth aspect, the apparatus further includes:

an obtaining module, configured to obtain the identifier or the name of the application.

With reference to the second possible implementation of the fourth aspect, in a third possible implementation of the fourth aspect, the obtaining module is configured to:

request an application management unit to create the application and return the identifier or the name of the application.

With reference to the third possible implementation of the fourth aspect, in a fourth possible implementation of the fourth aspect, the obtaining module is configured to:

receive an identifier or a name sent by the application management unit, where the identifier or the name sent by the application management unit is sent by the application management unit after the application management unit creates the application; or receive an identifier or a name sent by the managed function management unit, where the identifier or the name sent by the managed function management unit is sent by the application management unit to the managed function management unit after the application management unit creates the application.

With reference to the fourth aspect, in a fifth possible implementation of the fourth aspect, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

With reference to the fourth possible implementation of the fourth aspect, in a sixth possible implementation of the fourth aspect, the application management unit is a network functions virtualization orchestrator NFVO or a virtualized network function manager VNFM.

With reference to any one of the foregoing possible implementations of the fourth aspect, in a seventh possible implementation of the fourth aspect, the managed function management unit includes an element manager EM.

The technical solutions provided in the embodiments of the present invention have the following beneficial effects: An NM sends the management request for the managed function object to the managed function management unit. The management request carries the indication information of the application, and the application may be any application that is managed by the managed function management unit and that is indicated by the indication information. After receiving the management request, the managed function management unit associates the managed function object with the application, so as to manage the managed function object. In other words, the managed function management unit flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some of the embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following further describes the implementations of the present invention in detail with reference to the accompanying drawings.

Figure 1A:
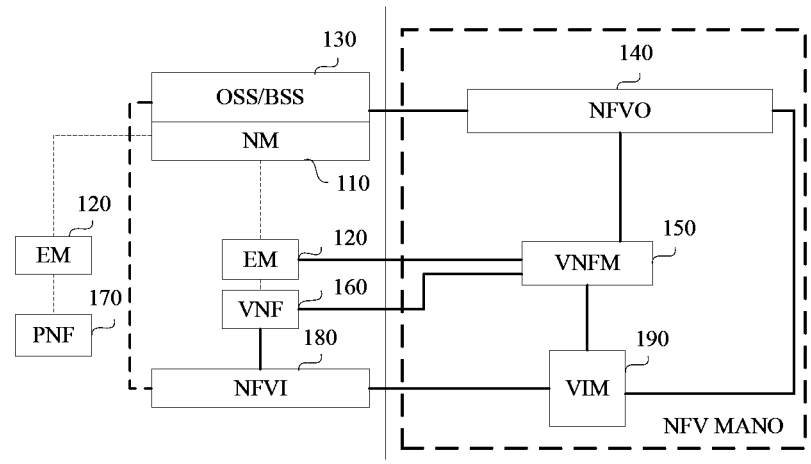
FIG. 1A is a schematic diagram of an NFV implementation environment according to an example embodiment.

FIG. 1A is a schematic diagram of an NFV implementation environment according to an example embodiment. The NFV implementation environment mainly includes a service management system and an NFV management and orchestration (MANO) system.

For the service management system, the 3$^{rd}$ Generation Partnership Project (3GPP) provides an independent managed object model (MOM). The service management system mainly includes a network manager (NM) 110 and an element manager (EM) 120, and is mainly responsible for managing a service or a network. All information, in the network or a network element, that is exposed to a user and that needs to be managed by the user is organized or presented to the user in an objectification manner, so that the user operates the network or the network element in an object operation manner. A managed object of the service management system is a network function. In a management process, the service management system needs to create a managed object for each network function. In this specification, the managed object of the network function is referred to as a managed function object for short. The NM 110 is disposed in an operation support system or a business support system (OSS/BSS) 130.

For the NFV MANO system, the European Telecommunications Standards Institute (ETSI) also provides an independent MOM from a perspective of deployment. The NFV MANO system mainly includes an NFV orchestrator (NFVO) 140 and a VNF manager (VNFM) 150, and is responsible for internal implementation of a telecommunications network function, that is, responsible for virtual resource management and software deployment. A main managed object of the NFV MANO system is a virtualized network function (VNF) 160 or a virtualized network function component (VNFC). The VNFC is a component of the VNF 160. Management on the VNFC may be actually considered as management on the VNF 160. Therefore, management on the VNFC is not described in a differentiated manner in this embodiment of the present invention.

One VNF 160 may include one or more VNFCs, and one VNF or one VNFC is one application.

It should be noted that only the plurality of units included in the implementation environment are described herein in detail. In an actual implementation process, the implementation environment may further include other units, to implement, in cooperation with the plurality of units, a method for managing a managed function object that is provided in the embodiments of the present invention. For example, the implementation environment may further include a physical network function (PNF) 170, a network functions virtualization infrastructure (NFVI) 180, and a virtualized infrastructure manager (VIM) 190, which are not described herein in detail in this embodiment of the present invention.

Figure 1B:
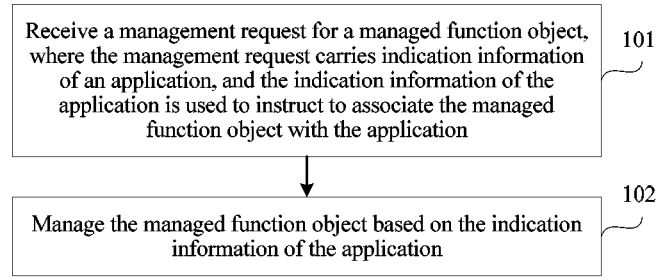
FIG. 1B is a flowchart of a method for managing a managed function object according to an example embodiment.

FIG. 1B is a flowchart of a method for managing a managed function object according to an example embodiment. This embodiment of the present invention is described by using an example in which the method for managing a managed function object is performed by a managed function management unit. The method for managing a managed function object may include the following steps.

Step 101: Receive a management request for a managed function object, where the management request carries indication information of an application, and the indication information of the application is used to associate the managed function object with the application.

The management request may be at least one of a managed function object creation request, a managed function object configuration request, a managed function object update request, and a request for associating a managed function object with an application.

Step 102: Manage the managed function object based on the indication information of the application.

In this embodiment of the present invention, an NM sends the management request for the managed function object to the managed function management unit. The management request carries the indication information of the application, and the application may be any application that is managed by the managed function management unit and that is indicated by the indication information. After receiving the management request, the managed function management unit associates the managed function object with the application, so as to manage the managed function object. In other words, the managed function management unit flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

In another embodiment, the indication information of the application includes an identifier or a name of the application.

In another embodiment, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In another embodiment, the managing the managed function object based on the indication information of the application includes:

obtaining an identifier or a name of the application based on the type information of the application or the information about the managed function object, to manage the managed function object.

In another embodiment, the obtaining an identifier or a name of the application based on the type information of the application or the information about the managed function object includes:

requesting, based on the type information of the application or the information about the managed function object, an application management unit to create the application and return the identifier or the name of the application; or obtaining the identifier or the name of the application based on the type information of the application or the information about the managed function object by deploying or selecting the application.

In another embodiment, the application management unit is a network functions virtualization orchestrator (NFVO) or a virtualized network function manager (VNFM).

In another embodiment, the managing the managed function object based on the indication information of the application includes:

associating the managed function object with the application by establishing a mapping relationship between the application and the managed function object.

In another embodiment, the managing the managed function object based on the indication information of the application includes:

associating the managed function object with the application by configuring the identifier or the name of the application in the managed function object.

In another embodiment, the managing the managed function object based on the indication information of the application includes:

associating the managed function object with the application by creating the managed function object for the application.

All the foregoing optional technical solutions may be randomly combined to form optional embodiments of this disclosure, and details are not described herein in this embodiment of this disclosure.

Figure 2:
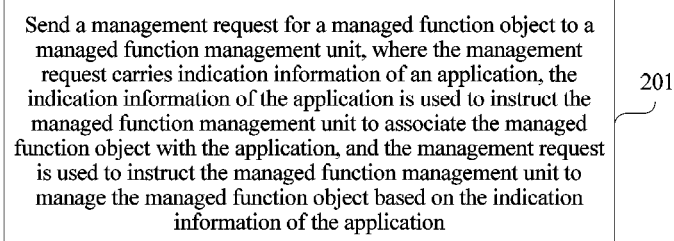
FIG. 2 is a flowchart of a method for managing a managed function object according to another example embodiment.

FIG. 2 is a flowchart of a method for managing a managed function object according to another example embodiment. This embodiment of the present invention is described by using an example in which the method for managing a managed function object is performed by an NM. The method for managing a managed function object may include the following step.

Step 201: Send a management request for a managed function object to a managed function management unit, where the management request carries indication information of an application, the indication information of the application is used to instruct the managed function management unit to associate the managed function object with the application, and the management request is used to instruct the managed function management unit to manage the managed function object based on the indication information of the application.

In this embodiment of the present invention, the NM sends the management request for the managed function object to the EM. The management request carries the indication information of the application, and the application may be any application that is managed by the EM and that is indicated by the indication information. After receiving the management request, the EM associates the managed function object with the application, so as to manage the managed function object. In other words, the EM flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

In another embodiment, the indication information of the application includes an identifier or a name of the application.

In another embodiment, before the sending a management request for a managed function object to a managed function management unit, the method further includes:

obtaining the identifier or the name of the application.

In another embodiment, the obtaining the identifier or the name of the application includes:

requesting an application management unit to create the application and return the identifier or the name of the application.

In another embodiment, the requesting an application management unit to create the application and return the identifier or the name of the application includes either of the following implementations:

receiving an identifier or a name sent by the application management unit, where the identifier or the name sent by the application management unit is sent by the application management unit after the application management unit creates the application; or receiving an identifier or a name sent by the managed function management unit, where the identifier or the name sent by the managed function management unit is sent by the application management unit to the managed function management unit after the application management unit creates the application.

In another embodiment, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In another embodiment, the application management unit is a network functions virtualization orchestrator NFVO or a virtualized network function manager VNFM.

In another embodiment, the managed function management unit includes an element manager EM.

All the foregoing optional technical solutions may be randomly combined to form optional embodiments of this disclosure, and details are not described herein in this embodiment of this disclosure.

Figure 3:
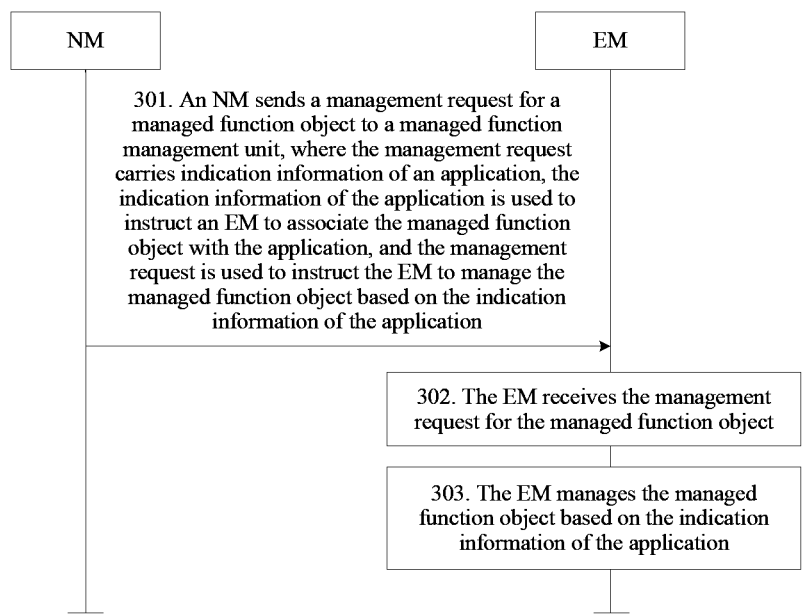
FIG. 3 is a flowchart of a method for managing a managed function object according to another example embodiment.

FIG. 3 is a flowchart of a method for managing a managed function object according to another example embodiment. This embodiment of the present invention is described by using an example in which the method for managing a managed function object is implemented in a multi-party interaction manner. The method for managing a managed function object may include the following steps.

Step 301: An NM sends a management request for a managed function object to a managed function management unit, where the management request carries indication information of an application, the indication information of the application is used to instruct the EM to associate the managed function object with the application, and the management request is used to instruct the EM to manage the managed function object based on the indication information of the application.

Currently, when a plurality of telecommunications network functions are implemented by using an NFV technology, a service management system responsible for service management and an NFV MANO system responsible for internal function implementation belong to different unit management, in other words, the service management system and the NFV MANO system belong to two independent MOMs. Therefore, how to combine the managed function object with the application to externally provide a network server is of great importance.

Therefore, the method for managing a managed function object is provided in this embodiment of the present invention. In the method, a managed function object at a service layer is flexibly associated with a VNF at a deployment layer, so as to manage the managed function object. In this embodiment of the present invention, in addition to performing association management on the managed function object and the application, management on the managed function object may include performing creation management, update management, service parameter configuration management, and the like on the managed function object. Details are described below. In addition, managing the managed function object and the application is pointing the managed function object at the application.

The managed function management unit may include any one of an EM, a VNFM, and a network function manager (NFM). In this embodiment of the present invention, an example in which the managed function management unit is the EM is used for description.

It should be noted herein that the indication information of the application may include different content. Specifically, content included in the indication information of the application may include any one of the following several possible implementations:

Manner 1: The indication information includes an identifier or a name of the application.

The identifier of the application may be used to uniquely identify the application. When the VNF is an application, the identifier of the application may also be an identifier of the VNF. The name of the application may also be used to uniquely identify the application. Similarly, when the VNF is an application, the name of the application may also be a name of the VNF.

In addition, in this implementation, the indication information may further include application container information of the application, and the application container information includes an application container identifier or an application container name.

An application container of the application is configured to provide an execution environment for the application, and the application container may run one VNF, or may run a plurality of VNFs. The application container identifier may be used to uniquely identify an application container, and certainly, the application container name may also be used to uniquely identify an application container. An application may be uniquely determined with reference to the application container information. In a possible implementation, the application container information may be included in the identifier or the name of the application. For example, the application container information is included in the identifier of the application. In this case, the application container information is a composition part of the identifier of the application, in other words, the identifier of the application includes the application container information. In this embodiment of the present invention, the identifier or the name of the application actually implicitly includes the application container information.

An application may be uniquely determined with reference to the application container information because in an actual application process, one computer may be virtualized into a plurality of application containers, and each application container may run one VNF or a plurality of VNFs, in other words, one application container may include at least one application. Applications in different application containers may have a same identifier or name, for example, when the indication information includes the name of the application, a name of an application 1 in an application container A may be Application_1, and a name of an application 2 in an application container B may also be Application_1. Therefore, to uniquely determine an application, the indication information needs to include application container information of the application.

Manner 2: The indication information of the application includes type information of the application, and the type information of the application includes a type or a descriptor identifier of the application.

The type information of the application may be used to indicate a type of application, and the type of application may include different versions of applications.

The descriptor identifier of the application may be used to uniquely identify a descriptor. A type of application instance, namely, a plurality of applications, may be generated based on the descriptor.

Manner 3: The indication information of the application includes information about the managed function object, and the information about the managed function object includes at least one of an identifier or a name of the managed function object, an identifier or a name of a managed function object class, and attribute information of a managed function object class.

The identifier or the name of the managed function object may be used to uniquely identify the managed function object. The identifier or the name of the managed function object class may be used to uniquely identify the managed function object class. A managed function object may be uniquely created based on the managed function object class. The attribute information of the managed function object class is used to identify a type of managed function object class. The type of managed function object class may include a plurality of different managed function object classes, in other words, a plurality of different managed function objects may be created based on the type of managed function object class.

It can be learned from the foregoing descriptions that the content of the indication information of the application may include the foregoing three possible implementations. Cases in which the NM sends the management request to the EM are different depending on different content included in the indication information of the application. Next, the cases in which the NM sends the management request to the EM are separately described based on the different content included in the indication information of the application.

Manner 1: The indication information of the application includes an identifier or a name of the application.

When the indication information of the application includes the identifier or the name of the application, in other words, the indication information of the application includes the identifier or the name of the application, it indicates that the NM learns of the identifier or the name of the application in advance. Therefore, when sending the management request for the managed function object to the EM, the NM further needs to obtain the identifier or the name of the application.

An implementation process of obtaining the identifier or the name of the application may be: obtaining the identifier or the name of the application based on type information of the application. An implementation process of obtaining the identifier or the name of the application based on the type information of the application may include: obtaining the identifier or the name of the application based on the type information of the application by requesting an application management unit to create the application and return the identifier or the name of the application.

The application management unit may be an NFVO or a VNFM. This is not limited in this embodiment of the present invention.

To be specific, in this implementation, before sending the management request for the managed function object to the EM, the NM requests, by using a life cycle management operation for the application, to create an application. That is, the NM sends an application creation request to the application management unit. The application creation request may carry the type information of the application. In this case, it indicates that a type of an application that needs to be created is specified by the NM, in other words, a subsequent application that needs to be associated with the managed function object is specified by the NM. In addition, in another possible implementation, the application creation request may further carry version information of the application. In this way, the application is explicitly specified by the NM.

Certainly, in a possible implementation, the application creation request may not carry the type information of the application. In this case, after receiving the application creation request, the application management unit may create any application by default, to be specific, a subsequent application that needs to be associated with the managed function object is specified by the application management unit by default. This is not limited in this embodiment of the present invention. In this embodiment of the present invention, an example in which the application creation request carries the type information of the application is used for description.

Correspondingly, after receiving the application creation request, the application management unit creates an application corresponding to the type information, generates an identifier or a name of the application, and then returns the identifier and the name of the application. Manners in which the NM obtains the identifier or the name of the application are different depending on different paths for returning the identifier and the name of the application, and may specifically include any one of the following implementations (1) to (3).

(1) The NM obtains the identifier or the name of the application by receiving an identifier or a name sent by the application management unit, where the identifier or the name sent by the application management unit is sent by the application management unit after the application management unit creates the application.

In this implementation, after creating the application, the application management unit directly sends the identifier or the name of the application to the NM.

(2) The NM obtains the identifier or the name of the application by receiving an identifier or a name sent by the managed function management unit, where the identifier or the name sent by the managed function management unit is sent by the application management unit to the managed function management unit after the application management unit creates the application.

In this implementation, after creating the application, the application management unit sends the identifier or the name to the EM, and the EM forwards the identifier or the name to the NM.

(3) When the indication information includes application container information, the application management unit may further return the application container information, and the EM returns the identifier or the name of the application.

The identifier or the name of the application is obtained in the plurality of different manners, so that a manner of obtaining the identifier or the name is added.

In addition, it should be noted that the application creation request may be directly sent by the NM to the application management unit, or in another possible implementation, the NM may use the EM to forward the application creation request to the application management unit. This is not limited in this embodiment of the present invention.

Manner 2: The indication information of the application includes type information of the application.

When the indication information of the application includes the type information of the application, the NM directly sends the management request for the managed function object to the EM. To be specific, the NM specifies a type of an application to be associated with the managed function object, and then the EM associates the managed function object with the application based on the type information of the application. For a specific implementation process, refer to step 303.

Manner 3: The indication information of the application includes information about the managed function object.

In this implementation, the NM directly sends the management request for the managed function object to the EM. To be specific, the NM does not specify any information about an application to be associated with the managed function object, and instead, the EM determines a corresponding application based on the information about the managed function object, and associates the managed function object with the determined application. For a specific implementation process, refer to step 303.

Step 302: The EM receives the management request for the managed function object.

Step 303: The EM manages the managed function object based on the indication information of the application.

After receiving the management request for the managed function object that is sent by the NM, the EM obtains the indication information of the application from the management request, and then may manage the managed function object based on the indication information of the application.

It should be noted herein that in addition to performing association management on the managed function object and the application, management on the managed function object may include performing creation management, update management, and service parameter configuration management on the managed function object. To be specific, the management request may be a managed function object configuration request, and the managed function object configuration request is used to instruct the EM to configure a service parameter for the managed function object, that is, the EM needs to re-associate the managed function object with the application when configuring a service parameter of the managed function object. Alternatively, the management request may be a managed function object update request, and the managed function object update request is used to instruct the EM to update the managed function object, that is, the EM needs to re-associate the managed function object with the application when updating the managed function object. Alternatively, the management request may be a managed function object creation request, and the managed function object creation request is used to instruct the EM to create the managed function object, that is, the EM needs to manage the application and the managed function object when creating the managed function object. Certainly, the management request may be a request for associating a managed function object with an application, and the request for associating a managed function object with an application is only used to instruct to associate the managed function object with the application. This is not limited in this embodiment of the present invention.

An implementation process of managing the managed function object based on the indication information of the application may include the following several possible implementations depending on different content of the indication information of the application.

Manner 1: The managed function object is associated with the application by establishing a mapping relationship between the application and the managed function object.

In this implementation, the EM may store the mapping relationship between the application and the managed function object by using a mapping list, so as to associate the managed function object with the application.

The EM further needs to obtain the identifier or the name of the application before associating the managed function object with the application by establishing the mapping relationship between the application and the managed function object. An implementation process of obtaining the identifier or the name of the application may include either of the following implementations (4) and (5) depending on different content included in the indication information of the application:

(4) The identifier or the name is obtained from the management request.

In this implementation, the identifier or the name is carried in the management request. In this way, the EM may directly obtain the identifier or the name of the application after receiving the management request.

(5) The identifier or the name of the application is obtained based on type information of the application or information about the managed function object.

In this implementation, after receiving the management request, the EM determines, based on the type information of the application or the information about the managed function object, an application corresponding to the type information of the application or the information about the managed function object, and then obtains the identifier or the name of the application.

In a possible implementation, an application corresponding to the type information of the application or the information about the managed function object may exist in all applications managed by the EM. In this case, the EM may directly obtain the identifier or the name of the application based on the type information of the application or the information about the managed function object.

Specifically, the EM determines a plurality of applications corresponding to the type information of the application or the information about the managed function object, then selects an application from the plurality of applications according to a specified selection rule, and determines the selected application as an application corresponding to the identifier or the name.

The specified selection rule may be customized by a user depending on an actual requirement, or may be set by the EM by default. This is not limited in this embodiment of the present invention.

In addition, in another possible implementation, an application corresponding to the type information of the application or the information about the managed function object may exist in none of applications managed by the EM. In this case, the EM needs to obtain the identifier or the name of the application based on the type information of the application or the information about the managed function object. A specific implementation process may include either of the following implementations (a) and (b):

(a) The identifier or the name of the application is obtained based on the type information of the application or the information about the managed function object by requesting an application management unit to create the application and return the identifier or the name of the application.

Specifically, in this implementation, the EM sends an application creation request to the application management unit. Similar to the foregoing implementation process in which the NM sends the application creation request to the application management unit, the application creation request may carry the type information of the application, or may not carry the type information of the application. When the application creation request carries the type information of the application, it indicates that the application is specified by the EM; or when the creation request does not carry the type information of the application, it indicates that the application may be specified by the application management unit. After receiving the application creation request, the application management unit creates the application, and returns the generated identifier or name of the application to the EM. In this way, the EM may obtain the identifier or the name of the application.

(b) The identifier or the name of the application is obtained based on the type information of the application or the information about the managed function object by deploying or selecting the application.

In this implementation, if an application corresponding to the type information of the application or the information about the managed function object exists in none of applications managed by the EM, the EM may further deploy or select the corresponding application based on the type information of the application or the information about the managed function object, and then generate the identifier or the name of the application. In this way, the EM may also obtain the identifier or the name of the application.

Manner 2: The managed function object is associated with the application by configuring the identifier or the name of the application in the managed function object.

Before configuring the identifier or the name of the application in the managed function object, the EM also needs to obtain the identifier or the name of the application. For a method for obtaining the identifier or the name of the application, refer to the first implementation. Details are not described herein again.

In this implementation, a plurality of preset attribute parameters may be configured in the managed function object, and all of the plurality of preset attribute parameters are used to configure an identifier or a name of an application associated with the managed function object. That is, after obtaining the identifier or the name of the application, the EM configures the identifier or the name of the application in the plurality of preset attribute parameters, so as to associate the managed function object with the application, and further manage the managed function object.

All of the plurality of preset attribute parameters may be customized by a user depending on an actual requirement, or may be set by the NM by default. This is not limited in this embodiment of the present invention.

After configuring the identifier or the name of the application in the managed function object, the EM may configure a configured managed function object in a network element (NE) or a VNF. This is not limited in this embodiment of the present invention.

Manner 3: The managed function object is associated with the application by creating the managed function object for the application.

In this implementation, the management request is used to instruct the EM to create the managed function object for the application. It should be noted herein that a specific implementation of how to create the managed function object for the application is not limited in this embodiment of the present invention.

It should be noted that, in the method for managing a managed function object that is provided above, when the indication information of the application includes the information about the managed function object, and the information about the managed function object includes at least one of an identifier or a name of a managed function object class and attribute information of a managed function object class, the management request is further used to instruct the EM to create the managed function object based on the managed function object class, and then the EM associates the generated managed function object with the application. For a specific implementation process in which the EM associates the generated managed function object with the application, refer to the foregoing description. Details are not described herein again.

In addition, it should be noted that this embodiment of the present invention is described only by using an example in which the managed function object is managed based on the indication information of the application in the foregoing several manners. In another embodiment, the managed function object may be further managed based on the indication information of the application in another manner. This is not limited in this embodiment of the present invention.

In this embodiment of the present invention, the NM sends the management request for the managed function object to the EM. The management request carries the indication information of the application, and the application may be any application that is managed by the EM and that is indicated by the indication information. After receiving the management request, the EM associates the managed function object with the application, so as to manage the managed function object. In other words, the EM flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

Figure 4A:
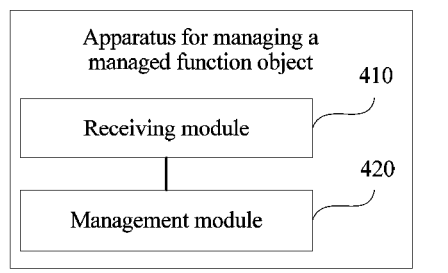
FIG. 4A is a schematic structural diagram of an apparatus for managing a managed function object according to an example embodiment.

FIG. 4A is a schematic structural diagram of an apparatus for managing a managed function object according to an example embodiment. The apparatus may be implemented by using software, hardware, or a combination thereof, and the apparatus includes:

a receiving module 410, configured to receive a management request for a managed function object, where the management request carries indication information of an application, and the indication information of the application is used to associate the managed function object with the application; and a management module 420, configured to manage the managed function object based on the indication information of the application.

Figure 4B:
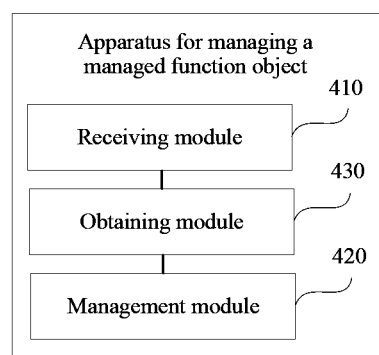
FIG. 4B is a schematic structural diagram of an apparatus for managing a managed function object according to another example embodiment.

In another embodiment, referring to FIG. 4B, the indication information of the application includes an identifier or a name of the application.

In another embodiment, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In another embodiment, the apparatus further includes:

an obtaining module 430, configured to obtain an identifier or a name of the application based on the type information of the application or the information about the managed function object, to manage the managed function object.

In another embodiment, the obtaining module 430 is configured to:

request, based on the type information of the application or the information about the managed function object, an application management unit to create the application and return the identifier or the name of the application; or obtain the identifier or the name of the application based on the type information of the application or the information about the managed function object by deploying or selecting the application.

In another embodiment, the application management unit is a network functions virtualization orchestrator NFVO or a virtualized network function manager VNFM.

In another embodiment, the management module 420 is configured to:

associate the managed function object with the application by establishing a mapping relationship between the application and the managed function object.

In another embodiment, the management module 420 is configured to:

associate the managed function object with the application by configuring the identifier or the name of the application in the managed function object.

In another embodiment, the management module 420 is configured to:

associate the managed function object with the application by creating the managed function object for the application.

In this embodiment of the present invention, an NM sends the management request for the managed function object to a managed function management unit. The management request carries the indication information of the application, and the application may be any application that is managed by the managed function management unit and that is indicated by the indication information. After receiving the management request, the managed function management unit associates the managed function object with the application, so as to manage the managed function object. In other words, the managed function management unit flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

Figure 5A:
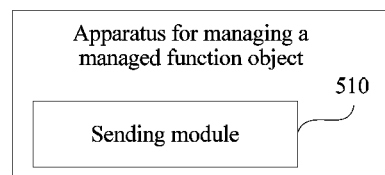
FIG. 5A is a schematic structural diagram of an apparatus for managing a managed function object according to another example embodiment.

FIG. 5A is a schematic structural diagram of an apparatus for managing a managed function object according to another example embodiment. The apparatus may be implemented by using software, hardware, or a combination thereof, and the apparatus includes:

a sending module 510, configured to send a management request for a managed function object to a managed function management unit, where the management request carries indication information of an application, the indication information of the application is used to instruct the managed function management unit to associate the managed function object with the application, and the management request is used to instruct the managed function management unit to manage the managed function object based on the indication information of the application.

Figure 5B:
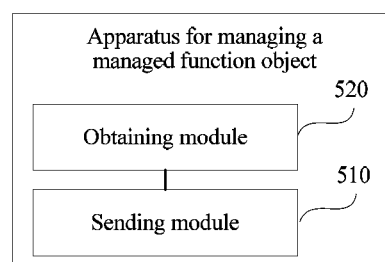
FIG. 5B is a schematic structural diagram of an apparatus for managing a managed function object according to another example embodiment.

In another embodiment, referring to FIG. 5B, the indication information of the application includes an identifier or a name of the application.

In another embodiment, the apparatus further includes:

an obtaining module 520, configured to obtain the identifier or the name of the application.

In another embodiment, the obtaining module 520 is configured to:

request an application management unit to create the application and return the identifier or the name of the application.

In another embodiment, the obtaining module 520 is configured to:

receive an identifier or a name sent by the application management unit, where the identifier or the name sent by the application management unit is sent by the application management unit after the application management unit creates the application; or receive an identifier or a name sent by the managed function management unit, where the identifier or the name sent by the managed function management unit is sent by the application management unit to the managed function management unit after the application management unit creates the application.

In another embodiment, the indication information of the application includes type information of the application or information about the managed function object, the type information of the application includes a type or a descriptor identifier of the application, and the information about the managed function object includes at least one of an identifier or a name of the managed function object, an identifier or a name of a managed function object class, and attribute information of a managed function object class.

In another embodiment, the application management unit is a network functions virtualization orchestrator NFVO or a virtualized network function manager VNFM.

In another embodiment, the managed function management unit includes an element manager EM.

In this embodiment of the present invention, an NM sends the management request for the managed function object to the managed function management unit. The management request carries the indication information of the application, and the application may be any application that is managed by the managed function management unit and that is indicated by the indication information. After receiving the management request, the managed function management unit associates the managed function object with the application, so as to manage the managed function object. In other words, the managed function management unit flexibly associates the managed function object with the any application indicated by the indication information, so as to combine the managed function object with the any application, thereby externally providing a network service. In addition, when a service parameter of the managed function object is configured in the VNF, the managed function object may be any managed function object that has an association relationship with an application corresponding to the VNF, so that flexibility is also improved.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of the present invention, but are not intended to limit the embodiments of the present invention. Any modification, equivalent replacement, and improvement made without departing from the principle of the embodiments of the present invention shall fall within the protection scope of the embodiments of the present invention.

What is claimed is:

1. A method for managing a managed function object, the method comprising:

receiving a management request for the managed function object, wherein the management request carries indication information of an application that is used to associate the managed function object with the application, wherein the indication information of the application comprises type information of the application, wherein the type information of the application comprises a descriptor identifier that uniquely identifies a descriptor, and wherein an application type is generated based on the descriptor identifier; and managing the managed function object based on the application type generated from the descriptor identifier of the indication information of the application.

2. The method according to claim 1, wherein the managing the managed function object based on the indication information of the application comprises:

obtaining an identifier or a name of the application based on the type information of the application, to manage the managed function object.

3. The method according to claim 2, wherein the obtaining the identifier or the name of the application based on the type information of the application or the information about the managed function object comprises:

requesting, based on the type information of the application, an application management unit to create the application and return the identifier or the name of the application.

4. The method according to claim 2, wherein the managing the managed function object based on the indication information of the application comprises:

associating the managed function object with the application by configuring the identifier or the name of the application in the managed function object.

5. An apparatus for managing a managed function object, the apparatus comprising:

a receiver, configured to cooperate with a processor to receive a management request for the managed function object, wherein the management request carries indication information of an application that is used to associate the managed function object with the application; and the processor, configured to manage the managed function object based on an application type generated from the descriptor identifier of the indication information of the application, wherein the indication information of the application comprises type information of the application, wherein the type information of the application comprises a descriptor identifier that uniquely identifies a descriptor, and wherein the application type is generated based on the descriptor identifier.

6. The apparatus according to claim 5, wherein the processor is further configured to:

obtain an identifier or a name of the application based on the type information of the application, to manage the managed function object.

7. The apparatus according to claim 6, wherein the processor is configured to:

request, based on the type information of the application, an application management unit to create the application and return the identifier or the name of the application.

8. The apparatus according to claim 6, wherein the processor is configured to:

associate the managed function object with the application by configuring the identifier or the name of the application in the managed function object.

9. An apparatus for managing a managed function object, the apparatus comprising:
   a processor; and
   a transmitter, configured to cooperate with the processor to send a management request for a managed function object to a managed function management unit, wherein the management request carries indication information of an application that instructs the managed function management unit to associate the managed function object with the application, and the management request instructs the managed function management unit to manage the managed function object based on an application type generated from the descriptor identifier of the indication information of the application,
   wherein the indication information of the application comprises type information of the application, wherein the type information of the application comprises a descriptor identifier that uniquely identifies a descriptor, and wherein the application type is generated based on the descriptor identifier.

10. The apparatus according to claim 9, wherein managing the managed function object based on the indication information of the application comprises:
   obtaining an identifier or a name of the application based on the type information of the application, to manage the managed function object.

11. The apparatus according to claim 10, wherein obtaining the identifier or the name of the application based on the type information of the application or the information about the managed function object comprises:
   requesting, based on the type information of the application, an application management unit to create the application and return the identifier or the name of the application.

12. The apparatus according to claim 10, wherein managing the managed function object based on the indication information of the application comprises:
   associating the managed function object with the application by configuring the identifier or the name of the application in the managed function object.

* * * * *